US008640805B2

(12) United States Patent
Kuroki

(10) Patent No.: US 8,640,805 B2
(45) Date of Patent: Feb. 4, 2014

(54) BICYCLE WITH AUXILIARY POWER UNIT

(75) Inventor: Masahiro Kuroki, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 247 days.

(21) Appl. No.: 13/211,809

(22) Filed: Aug. 17, 2011

(65) Prior Publication Data

US 2012/0048635 A1    Mar. 1, 2012

(30) Foreign Application Priority Data

Aug. 31, 2010 (JP) .................................. 2010-195023

(51) Int. Cl.
*B62M 6/40* (2010.01)
*B62M 6/45* (2010.01)

(52) U.S. Cl.
USPC .................. 180/206.1; 180/205.1; 180/206.2; 180/220

(58) Field of Classification Search
USPC .......... 180/205.1, 206.1, 206.2, 206.3, 206.4, 180/220, 65.6; 280/212
See application file for complete search history.

(56) References Cited

U.S. PATENT DOCUMENTS

| 5,570,752 A * | 11/1996 | Takata .................. 180/206.4 |
| 6,073,717 A * | 6/2000 | Yamamoto et al. ........ 180/206.4 |
| 6,276,479 B1 * | 8/2001 | Suzuki et al. .............. 180/206.8 |
| 8,205,705 B2 * | 6/2012 | Li et al. .................. 180/206.4 |
| 2011/0168472 A1 * | 7/2011 | Li et al. .................. 180/206.4 |
| 2011/0180341 A1 * | 7/2011 | Chan .................... 180/206.4 |

FOREIGN PATENT DOCUMENTS

| JP | 2001-114179 A | 4/2001 |
| JP | 4036776 B2 | 1/2008 |

* cited by examiner

*Primary Examiner* — Kevin Hurley
*Assistant Examiner* — Marc A Scharich
(74) *Attorney, Agent, or Firm* — Birch, Stewart, Kolasch & Birch, LLP

(57) ABSTRACT

A bicycle includes an auxiliary power unit for regenerating electric energy even with no braking operations. A power-assisted bicycle includes a controller for detecting a torque value of a pedaling torque applied to a crankshaft for controlling an output of a brushless motor according to the torque value detected. A power transmitting member outputs the pedaling torque applied to the crankshaft to a rear wheel with a clutch unit for permitting an output of a driving force of the brushless motor to the rear wheel, but not an output of power from the rear wheel to the brushless motor. A selector selects whether or not to permit transmission of power from the rear wheel to the brushless motor. The clutch unit includes a lock-up ratchet for selectively permitting an output of power from the rear wheel WR to the brushless motor according to an operation of the selector.

20 Claims, 13 Drawing Sheets

BICYCLE WITH AUXILIARY POWER UNIT

CROSS-REFERENCE TO RELATED APPLICATIONS

The present application claims priority under 35 USC 119 to Japanese Patent Application No. 2010-195023 filed on Aug. 31, 2010 the entire contents of which are hereby incorporated by reference.

BACKGROUND OF THE INVENTION

1. Field of the Invention

The present invention relates to a bicycle with an auxiliary power unit capable of regenerating electric energy by using a rotational force of a wheel.

2. Description of Background Art

A known power-assisted bicycle, such as a bicycle with an auxiliary power unit, uses a motor as a regenerative power generator during, for example, deceleration to thereby recover kinetic energy as electric energy.

Japanese Patent Laid-Open No. 2001-114179 discloses a kinetic energy regenerative apparatus for a motor-driven bicycle. The kinetic energy regenerative apparatus generally includes a first driving force transmitting element, a second driving force transmitting element, an idler sprocket, and a driving force connecting/disconnecting clutch. More specifically, the first driving force transmitting element is fixed to a rear wheel hub and rotated with the rear wheel hub during regeneration. The second driving force transmitting element is driven by rotation of the first driving force transmitting element. The idler sprocket is driven by rotation of the second driving force transmitting element and meshes with a chain. The driving force connecting/disconnecting clutch is interposed between the chain and the motor. The arrangement allows the first driving force transmitting element, the second driving force transmitting element, and the idler sprocket to transmit rotation of the rear wheel hub to the chain during regeneration and the driving force connecting/disconnecting clutch to transmit rotation of the chain to the motor. As a result, electric energy can be regenerated using the rotational force of the wheel.

Japanese Patent No. 4036776 discloses an electric power-assisted bicycle that can regenerate electric energy with a simple structure in which a clutch unit that is operatively associated with a braking operation performed by a rider to change locking directions is connected to an output shaft of a motor.

However, the arrangement disclosed in Japanese Patent Laid-Open No. 2001-114179, includes the driving force connecting/disconnecting clutch for regeneration, the first driving force transmitting element, and the second driving force transmitting element, which contributes to a complicated structure and increased cost. Further, during deceleration, the rotational force of the wheel is converted to corresponding electric energy at all times, leaving the user no option of selecting whether or not to regenerate the electric energy.

In the related art disclosed in Japanese Patent No. 4036776, the locking directions are changed only when the rider performs the braking operation, so that the electric energy cannot be regenerated without the braking operation.

SUMMARY AND OBJECTS OF THE INVENTION

The present invention has been made to solve the related art problems and it is an object of an embodiment of the present invention to provide a bicycle with an auxiliary power unit that can, with an even simpler structure, selectively regenerate electric energy as necessary even with no braking operations.

To achieve the foregoing object, according to an embodiment of the present invention, there is provided a bicycle with an auxiliary power unit (10) including control means (52) for detecting a torque value of a pedaling torque applied to a crankshaft (36) and controlling an output of a motor (46) according to the torque value detected. The bicycle (10) includes power transmitting means (54) for outputting the pedaling torque applied to the crankshaft (36) to a drive wheel (WR) and including a clutch unit (110) for permitting an output of a driving force of the motor (46) to the drive wheel (WR), but not an output of power from the drive wheel (WR) to the motor (46); and selector means (112) for selecting whether or not to permit transmission of power from the drive wheel (WR) to the motor (46). In the bicycle (10), the clutch unit (110) includes reverse power transmitting means (124) for selectively permitting an output of power from the drive wheel (WR) to the motor (46) according to an operation of the selector means (112).

According to an embodiment of the present invention, the clutch unit (110) includes a one-way ratchet (136) for permitting an output of the driving force of the motor (46) to the drive wheel (WR), but not an output of power from the drive wheel (WR) to the motor (46); and a lock-up ratchet (124) as the reverse power transmitting means (124); and the clutch unit (110) normally permits transmission of only the power from the crankshaft (36) to the drive wheel (WR) and, when the lock-up ratchet (124) is made operative through the operation of the selector means (112), permits transmission of power from the drive wheel (WR) to the motor (46).

According to an embodiment of the present invention, the power transmitting means (54) includes a hollow output shaft (60) for outputting power to the drive wheel (WR); the selector means (112) is disposed inside the output shaft (60); and the lock-up ratchet (124) is selectively made operative or inoperative by pressing the selector means (112).

According to an embodiment of the present invention, the selector means (112) includes a first pressure section (114) having a hollow outside end and a second pressure section (116) disposed inside the first pressure section (114); and pressing the first pressure section (114) makes the lock-up ratchet (124) inoperative and pressing the second pressure section (116) makes the lock-up ratchet (124) operative.

According to an embodiment of the present invention, the selector means (112) further has a function of selecting whether or not to permit transmission of the driving force from the motor (46) to the drive wheel (WR); and rotating the first pressure section (114) when the lock-up ratchet (124) is inoperative makes the one-way ratchet (136) inoperative and the lock-up ratchet (124) operative, to thereby allow the clutch unit (110) not to permit transmission of the driving force from the motor (46) to the drive wheel (WR) and to permit transmission of power from the drive wheel (WR) to the motor (46).

According to an embodiment of the present invention, the pedaling torque applied to the crankshaft (36) and the driving force of the motor (46) are transmitted to the output shaft (60).

According to an embodiment of the present invention, the clutch unit (110) is interposed between the output shaft (60) and a drive shaft (56) of the motor (46).

According to an embodiment of the present invention, the power transmitting means (54) includes motor driving force transmitting means (58) for transmitting the driving force of the motor (46) to the output shaft (60); the clutch unit (110) is disposed on a side of the output shaft (60); and the motor driving force transmitting means (58) transmits the driving force of the motor (46) to the output shaft (60) via the clutch unit (110).

According to an embodiment of the present invention, the power transmitting means (54) includes motor driving force transmitting means (58) for transmitting the driving force of the motor (46) to the output shaft (60); the clutch unit (110) is disposed on a side of the drive shaft (56) of the motor (46); and the driving force of the motor (46) is transmitted to the motor driving force transmitting means (58) via the clutch unit (110).

According to an embodiment of the present invention, the motor (46) is disposed between the crankshaft (36) and the power transmitting means (54).

According to an embodiment of the present invention, in the bicycle with an auxiliary power unit (10) according to any one the first to tenth aspects of the present invention, the power transmitting means (54) is accommodated together with the motor (46) in a case (42).

According to an embodiment of the present invention, the reverse power transmitting means that selectively permits the output of power from the drive wheel to the motor is disposed in the clutch unit that transmits the driving force of the motor to the drive wheel, but not the power from the drive wheel to the motor. This arrangement allows electric energy to be regenerated, with an even simpler structure, selectively as necessary even with no braking operation.

According to an embodiment of the present invention, the selector means is disposed inside the hollow output shaft of the power transmitting means and pressing the selector means selectively makes the lock-up ratchet operative or inoperative. Electric energy can therefore be regenerated as necessary. Deceleration by regenerative braking can be canceled, which prevents the pedals from being pedaled unnecessarily. The selector means disposed inside the output shaft contributes to reduction in size.

According to an embodiment of the present invention, operating the selector means selectively makes the one-way clutch operative or inoperative. Only power from the drive wheel can be transmitted to the motor, while not allowing the driving force of the motor to be transmitted to the drive wheel as necessary.

According to an embodiment of the present invention, the pedaling torque applied to the crankshaft and the driving force of the motor are transmitted to the output shaft. This allows the output shaft to output power to the rear wheel by combining the pedaling torque with the driving force of the motor.

According to an embodiment of the present invention, the clutch unit is disposed on the side of the output shaft. This minimizes mechanical loss that would otherwise be generated when the pedals are stopped, reducing motor load during coasting.

According to an embodiment of the present invention, the clutch unit is disposed on the side of the drive shaft of the motor. This improves regeneration efficiency.

According to an embodiment of the present invention, the motor is disposed between the crankshaft and the power transmitting means. This improves not only regeneration efficiency, but also the function as the one-way clutch of the clutch unit.

According to an embodiment of the present invention, the power transmitting means is accommodated together with the motor in the same case. This helps prevent oils and greases from being splashed from the drive system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A bicycle with an auxiliary power unit according to a preferred embodiment of the present invention will be described in detail below with reference to the accompanying drawings.

Figure 1:
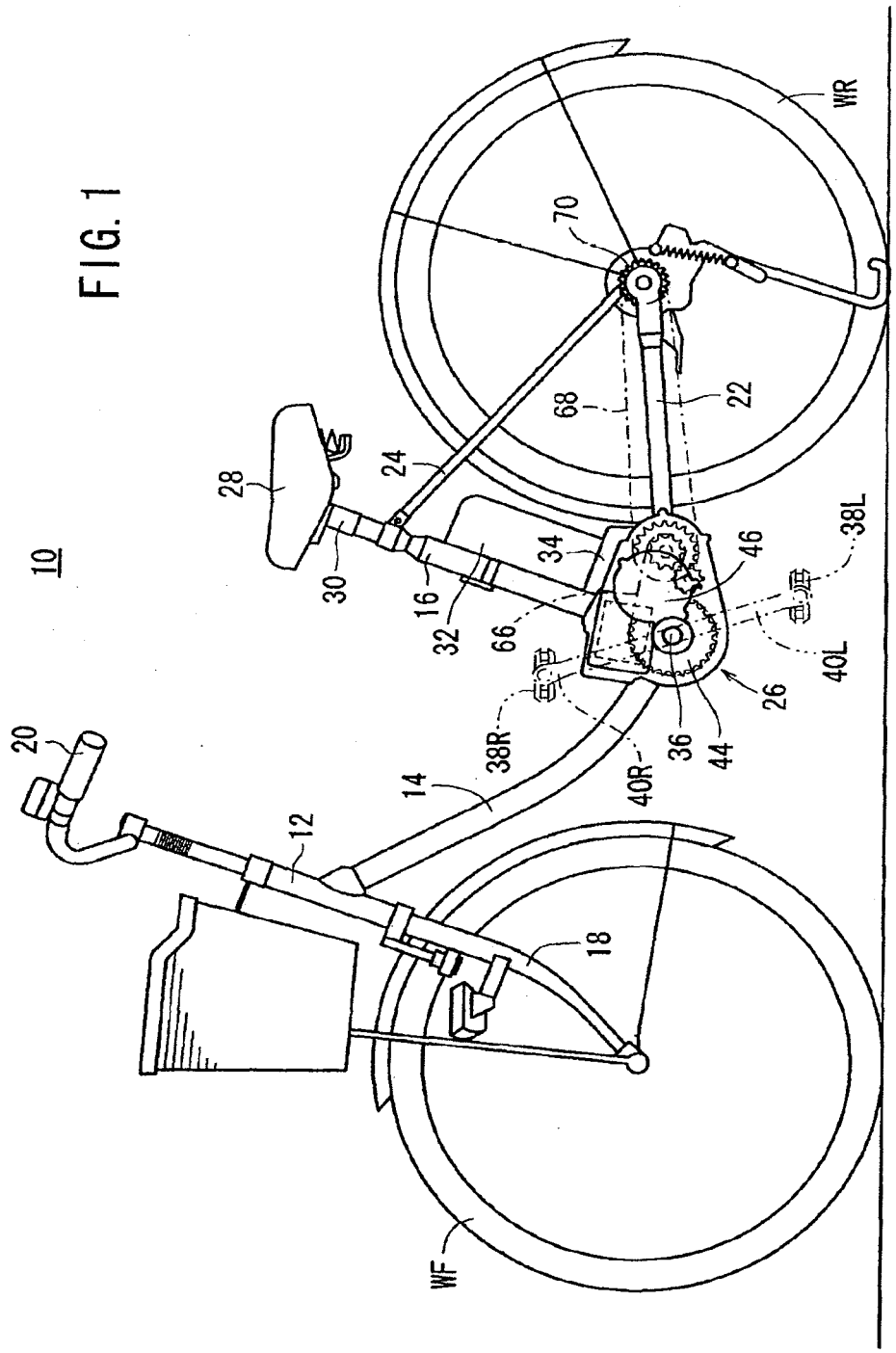
FIG. 1 is a left side elevational view showing a power-assisted bicycle (a bicycle with an auxiliary power unit)
Figure 2:
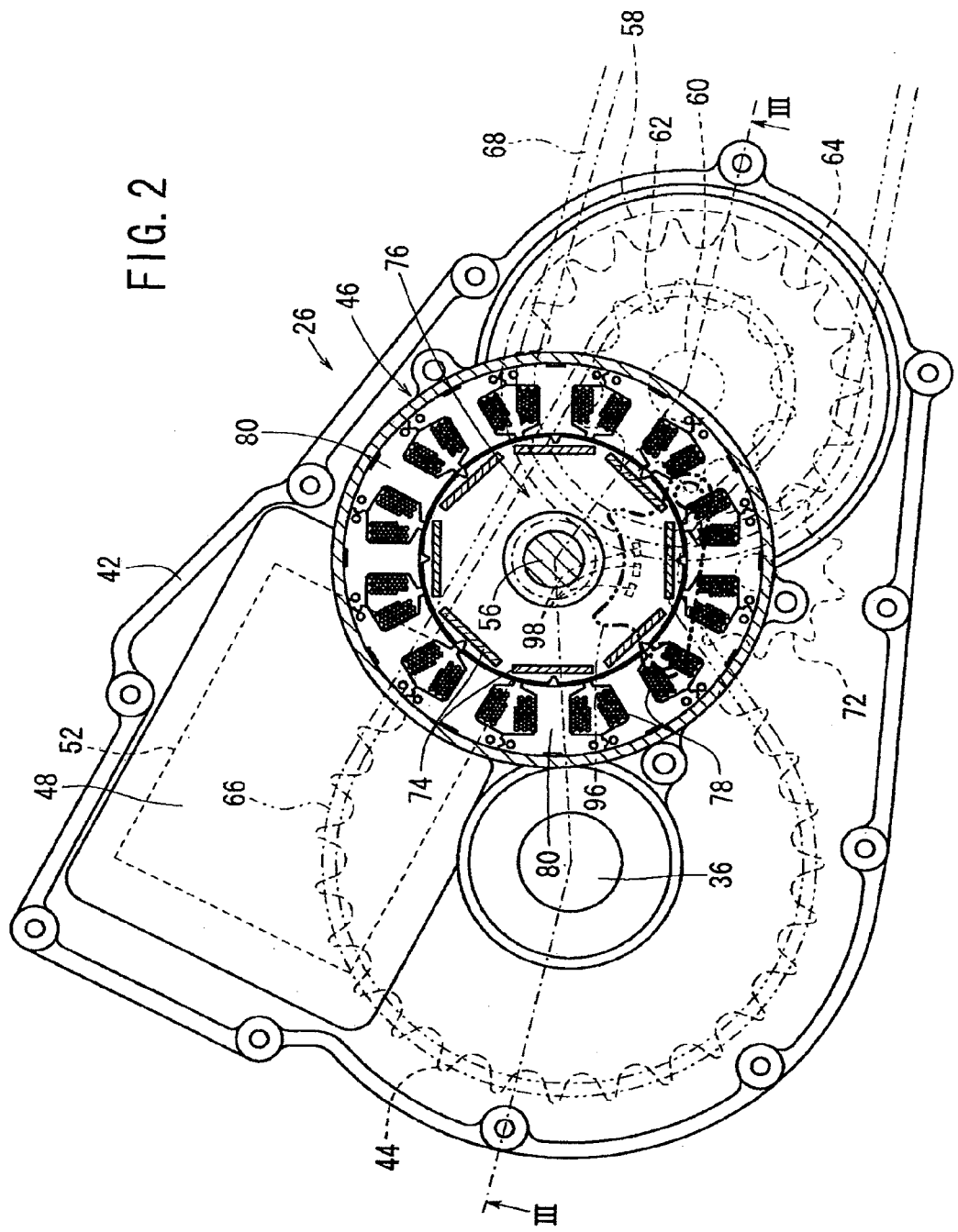
FIG. 2 is a left side elevational view showing a main part of the power-assisted bicycle shown in FIG. 1.
Figure 3:
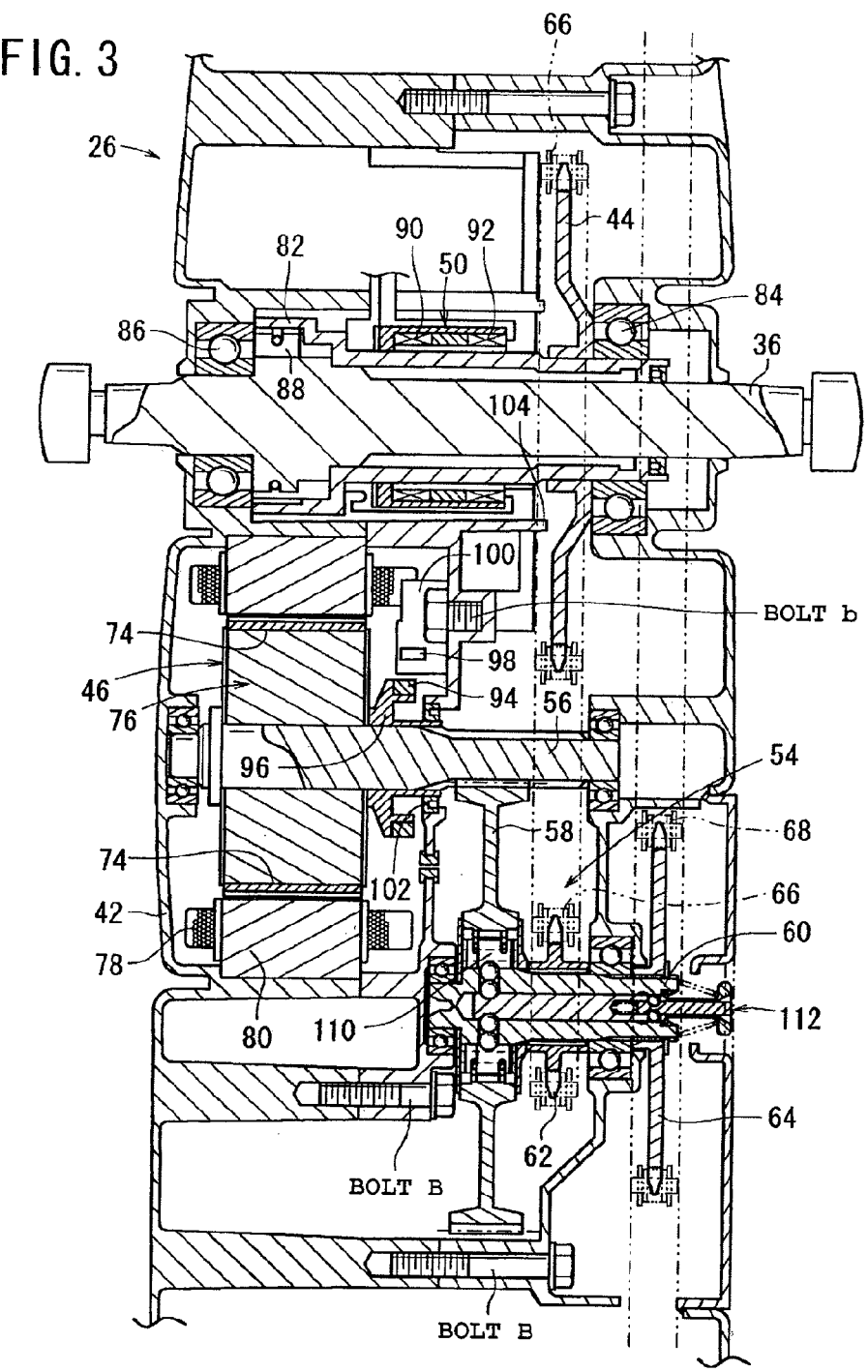
FIG. 3 is a partial cross-sectional view taken along line III-III of FIG. 2.

FIG. 1 is a left side elevational view showing a power-assisted bicycle 10 (a bicycle with an auxiliary power unit). FIG. 2 is a left side elevational view showing a main part of the power-assisted bicycle 10 shown in FIG. 1. FIG. 3 is a partial cross-sectional view taken along line III-III of FIG. 2. The power-assisted bicycle 10 generally includes a head pipe 12, a down frame 14, and a seat pipe 16. More specifically, the head pipe 12 is disposed forwardly of a bicycle body. The down frame 14 extends rearwardly and downwardly from the head pipe 12. The seat pipe 16 rises upwardly from a rear end of the down frame 14. A front fork 18 that extends downwardly is steerably connected to the head pipe 12. The front fork 18 includes a lower end that journals a front wheel WF. A handlebar 20 is disposed upwardly of the head pipe 12.

A rear fork 22 extending rearwardly is disposed at a rear end of the down frame 14. A rear wheel (drive wheel) WR is journaled at a rear end of the rear fork 22. In addition, a pair of left and right stays 24 is disposed between an upper portion of the seat pipe 16 and a rear portion of the rear fork 22.

The down frame 14 and the rear fork 22 support an assist drive unit 26. A seat post 30 having a seat 28 at an upper end thereof is mounted on the seat pipe 16 so as to permit adjustment of a vertical position of the seat 28. A battery 32 for supplying the assist drive unit 26 with electric power is removably mounted on a stay 34 rearwardly of the seat pipe 16.

A crankshaft 36 extending in a width direction of the bicycle body penetrates through the assist drive unit 26. A crank 40L having a pedal 38L and a crank 40R having a pedal 38R are connected to either side of the crankshaft 36.

The assist drive unit 26 generally includes a first sprocket 44, a brushless motor (motor) 46, a motor driver 48, a controller (control means) 52, and power transmitting means 54, all housed within a housing (case) 42 thereof. More specifically, the motor driver 48 drives the brushless motor 46. The controller 52 performs the detection of the torque value based on the value detected by a magnetostrictive torque sensor 50, and the PWM control of the motor driver 48 based on the torque value detected. The power transmitting means 54 outputs a driving force of the brushless motor 46, or even more specifically, power (rotational force) according to a pedaling torque applied to the crankshaft 36, to the rear wheel WR.

The power transmitting means 54 generally includes a drive gear (motor driving force transmitting means) 58, an output shaft 60, a second sprocket 62, and a third sprocket 64. The drive gear 58 rotates in mesh with a drive shaft 56 of the brushless motor 46. The output shaft 60 rotates according as the drive gear 58 rotates. The second sprocket 62 and the third sprocket 64 rotate integrally with the output shaft 60. Splines are formed on the output shaft 60. The second sprocket 62 and the third sprocket 64 are mounted on the output shaft 60 in a spline fit.

A first chain 66 is trained over the first sprocket 44 and the second sprocket 62. A second chain 68 is trained over the third sprocket 64 and a fourth sprocket 70 on the side of the rear wheel WR. When a rider pedals the pedals 38L, 38R, the pedaling torque is applied to the crankshaft 36. The pedaling torque applied to the crankshaft 36 causes the first sprocket 44 to rotate and the rotation of the first sprocket 44 is transmitted to the second sprocket 62 via the first chain 66. This results in the pedal torque being transmitted to the output shaft 60, so that the output shaft 60 rotates. The rotation of the output shaft 60 rotates the third sprocket 64 and the rotation of the third sprocket 64 is transmitted to the fourth sprocket 70 via the second chain 68. This results in the pedal torque being transmitted to the rear wheel WR, so that the rear wheel WR rotates. The crankshaft 36, the first sprocket 44, the power transmitting means 54, the first chain 66, the second chain 68, and the fourth sprocket 70 function as a drive system mechanism.

The controller 52 performs the PWM control of the motor driver 48 such that the brushless motor 46 generates assist torque defined by an assist ratio that corresponds to the pedaling torque applied to the crankshaft 36 and a bicycle speed of the power-assisted bicycle 10. The motor driver 48 includes switching devices for a plurality of phases (e.g., three phases of U-phase, V-phase, and W-phase). The controller 52 performs the PWM control of the motor driver 48 by controlling to turn ON or OFF each of the switching devices for U-phase, V-phase, and W-phase at a determined duty ratio. Through the PWM control, the motor driver 48 converts DC power of the battery to three-phase AC power, thus supplying a three-phase AC current to a U-phase stator coil, a V-phase stator coil, and a W-phase stator coil of the brushless motor 46. This rotates the drive shaft 56 of the brushless motor 46. The controller 52 has a clock circuit, thus functioning as a timer.

The assist torque generated by the brushless motor 46 is transmitted to the output shaft 60 via the drive shaft 56 and the drive gear 58. Pedaling of the pedals 38L, 38R by the rider therefore results in the pedaling torque applied to the crankshaft 36 and the assist torque generated by the brushless motor 46 being combined together in the output shaft 60, so that the combined torque is transmitted to the fourth sprocket 70 on the side of the rear wheel WR via the second chain 68, thereby rotating the rear wheel WR. To allow a large winding angle for the first chain 66, an idler 72 is disposed forwardly of the output shaft 60 and downwardly of the brushless motor 46. The idler 72 is urged in a direction of pressing the first chain 66 by a torsion spring not shown.

The brushless motor 46 includes a rotor 76 and a stator 80. The rotor 76 has a total of eight N-pole and S-pole permanent magnets 74 disposed alternately in a circumferential direction. The stator 80 has stator windings 78 disposed in radially opposed positions so as to surround an outer peripheral portion of the rotor 76. The stator windings 78 of three phases of U-phase, V-phase, and W-phase generate a rotational magnetic field to rotate the rotor 76. The drive shaft 56 is disposed on a rotary shaft of the rotor 76. Since there are a total of 12 stators 80, there are four each of the U-phase stator windings 78, the V-phase stator windings 78, and the W-phase stator windings 78. Stator coils of the brushless motor 46 are formed as follows. More specifically, a U-phase stator coil is formed of four U-phase stator windings 78, a V-phase stator coil is formed of four V-phase stator windings 78, and a W-phase stator coil is formed of four W-phase stator windings 78.

The assist drive unit 26 includes a mechanism that allows the first sprocket 44 to rotate when the pedals 38L, 38R are pedaled in a direction in which the power-assisted bicycle 10 moves in a forward direction (forward direction) and prevents the first sprocket 44 from rotating when the pedals 38L, 38R are pedaled in a direction opposite to the forward direction (backward direction). Referring to FIG. 3, the assist drive unit 26 includes a cylindrical member 82, a first bearing 84, a second bearing 86, and a one-way clutch 88. Specifically, the cylindrical member 82 is inserted over an outer periphery of the crankshaft 36. The first bearing 84 is disposed between the cylindrical member 82 and the housing 42. The second bearing 86 is disposed between the crankshaft 36 and the housing 42. The one-way clutch 88 is disposed between the crankshaft 36 and the cylindrical member 82. The one-way clutch 88 is structured so as to transmit rotation of the crankshaft 36 to the cylindrical member 82 when the pedals 38L, 38R are pedaled in the forward direction and not to transmit the rotation of the crankshaft 36 to the cylindrical member 82 when the pedals 38L, 38R are pedaled in the backward direction. Splines are formed on the right of the cylindrical member 82. The first sprocket 44 is mounted on the cylindrical member 82 in a spline fit.

When the pedals 38L, 38R are pedaled in the forward direction, the crankshaft 36 rotates and, through the functioning of the one-way clutch 88, the cylindrical member 82 rotates. This results in the first sprocket 44 rotating. When the pedals 38L, 38R are pedaled in the direction opposite to the forward direction, on the other hand, the cylindrical member 82 does not rotate through the functioning of the one-way clutch 88, though the crankshaft 36 rotates. As a result, the first sprocket 44 is not rotated even when the pedals 38L, 38R are pedaled in the direction opposite to the forward direction.

The magnetostrictive torque sensor 50 that detects the pedaling torque applied to the crankshaft 36 is disposed on the crankshaft 36. The magnetostrictive torque sensor 50 is disposed on the outer periphery of the cylindrical member 82. The magnetostrictive torque sensor 50 has a detecting circuit including two detecting coils 90, 92. The detecting circuit translates a change in inductance in each of the detecting coils 90, 92 produced by magnetostriction generated when the cylindrical member 82 rotates to a corresponding voltage and outputs the voltage to the controller 52. The cylindrical member 82 does not rotate when the pedals 38L, 38R are pedaled in the direction opposite to the forward direction, so that the magnetostrictive torque sensor 50 detects no pedaling torque applied to the crankshaft 36.

A magnet holder 96 for holding a magnet 94 is disposed on the drive shaft 56 of the brushless motor 46, rotating with the rotor 76. Three Hall ICs 98 (see FIG. 2) for detecting the magnet 94 are disposed so as to face the magnet 94. The three Hall ICs 98 detect a phase angle and a rotating speed of the rotor 76. The Hall ICs 98 are held in place by a Hall IC housing 100. The Hall IC housing 100 is attached to an inside of the housing 42 of the assist drive unit 26 with a bolt b. There are a total of eight magnets 94 disposed in a circumferential direction, N-pole magnets 94 and S-pole magnets 94 being alternately disposed. The magnets 94 and the Hall ICs 98 function as a magnetic pole sensor for detecting the phase angle of the brushless motor 46.

The brushless motor 46 and the drive gear 58 are housed in respective spaces defined one from the other. A dust seal 102 is disposed on an outer periphery of the magnet holder 96. The dust seal 102 prevents dust and other foreign matter from entering the space in which the brushless motor 46 is disposed from the space in which the drive gear 58 is disposed. A cover for protecting the brushless motor 46 is attached to the housing 42 of the assist drive unit 26 with a bolt B along an outer periphery of the brushless motor 46.

The housing 42 has a partition plate 104 with which to define spaces thereinside. The brushless motor 46 is disposed rearwardly and upwardly of the crankshaft 36 and forwardly of the power transmitting means 54. In addition, the brushless motor 46 is disposed and housed in a space defined from that for the magnetostrictive torque sensor 50. The motor driver 48 and the controller 52 are disposed upwardly of the magnetostrictive torque sensor 50.

While the magnetostrictive torque sensor 50 and the brushless motor 46 are housed in respective spaces defined one from the other, the magnetostrictive torque sensor 50 and the brushless motor 46 are close to each other. Though not shown, the motor driver 48 and the controller 52 are fixed to a wall of the housing 42 and to left and right walls, respectively, of the power-assisted bicycle 10.

A clutch unit 110 is disposed between the output shaft 60 and the drive gear 58. The clutch unit 110 permits the output of the driving force of the brushless motor 46 to the rear wheel WR, but not the output of power from the rear wheel WR to the brushless motor 46. The clutch unit 110 functions as a one-way clutch that transmits the driving force of the brushless motor 46 to the output shaft 60, but not the rotational force (power) of the output shaft 60 to the brushless motor 46. The power from the rear wheel WR to the brushless motor 46 refers to a rotational force generated in the rear wheel WR even when the rider does not pedal the pedals 38L, 38R, as, for example, on a slope. In this case, the rotational force generated in the rear wheel WR is transmitted to the output shaft 60 via the second chain 68. However, the power from the rear wheel WR is not, as a rule, outputted to the brushless motor 46.

The assist drive unit 26 includes selector means 112 for selecting whether or not to permit transmission of the power from the rear wheel WR to the brushless motor 46. The clutch unit 110 includes a mechanism that selectively permits the output of the power from the rear wheel WR to the brushless motor 46 according to an operation on the selector means 112.

Figure 4:
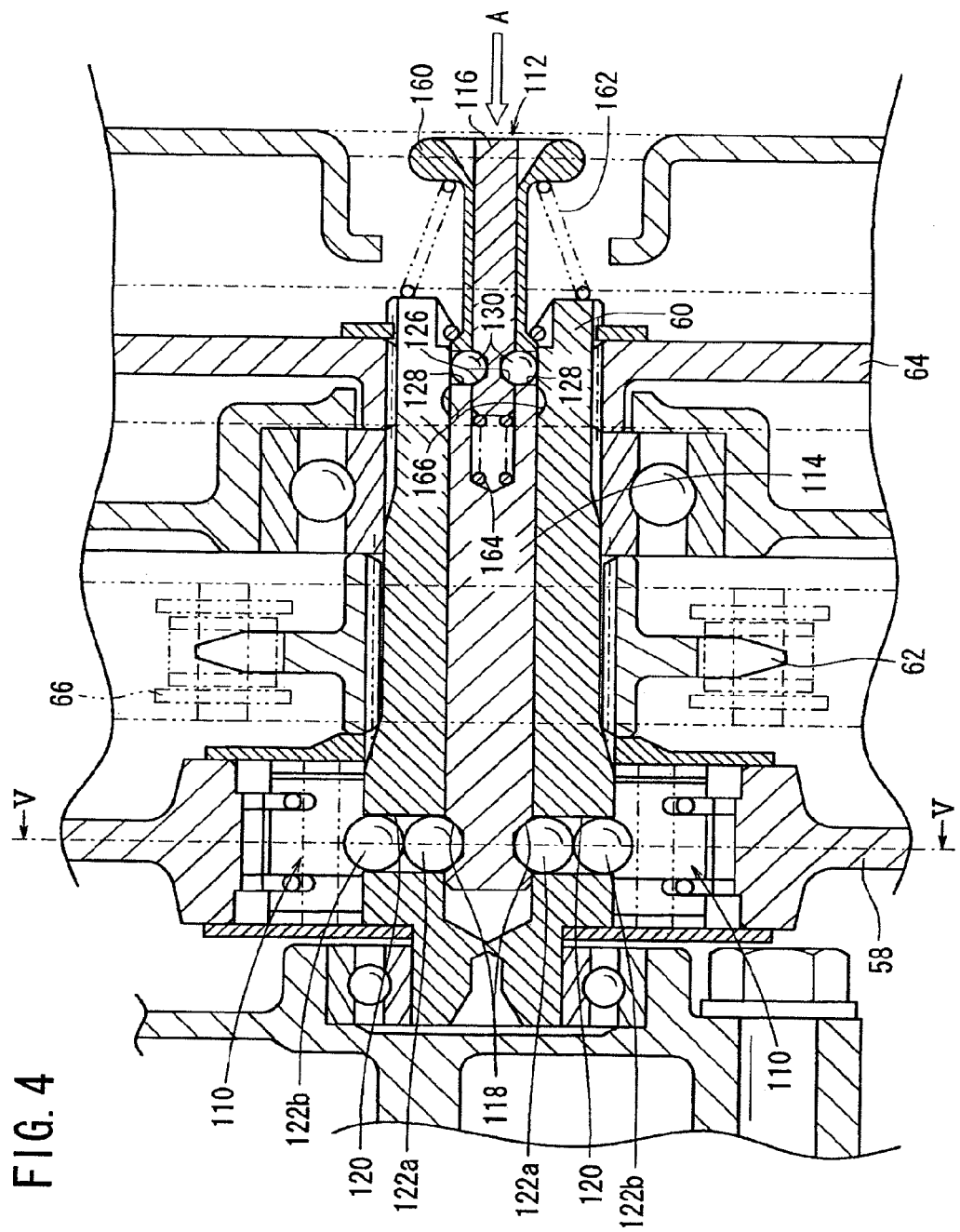
FIG. 4 is an enlarged view of a main part of the partial cross-sectional view taken along line III-III shown in FIG. 3.
Figure 5:
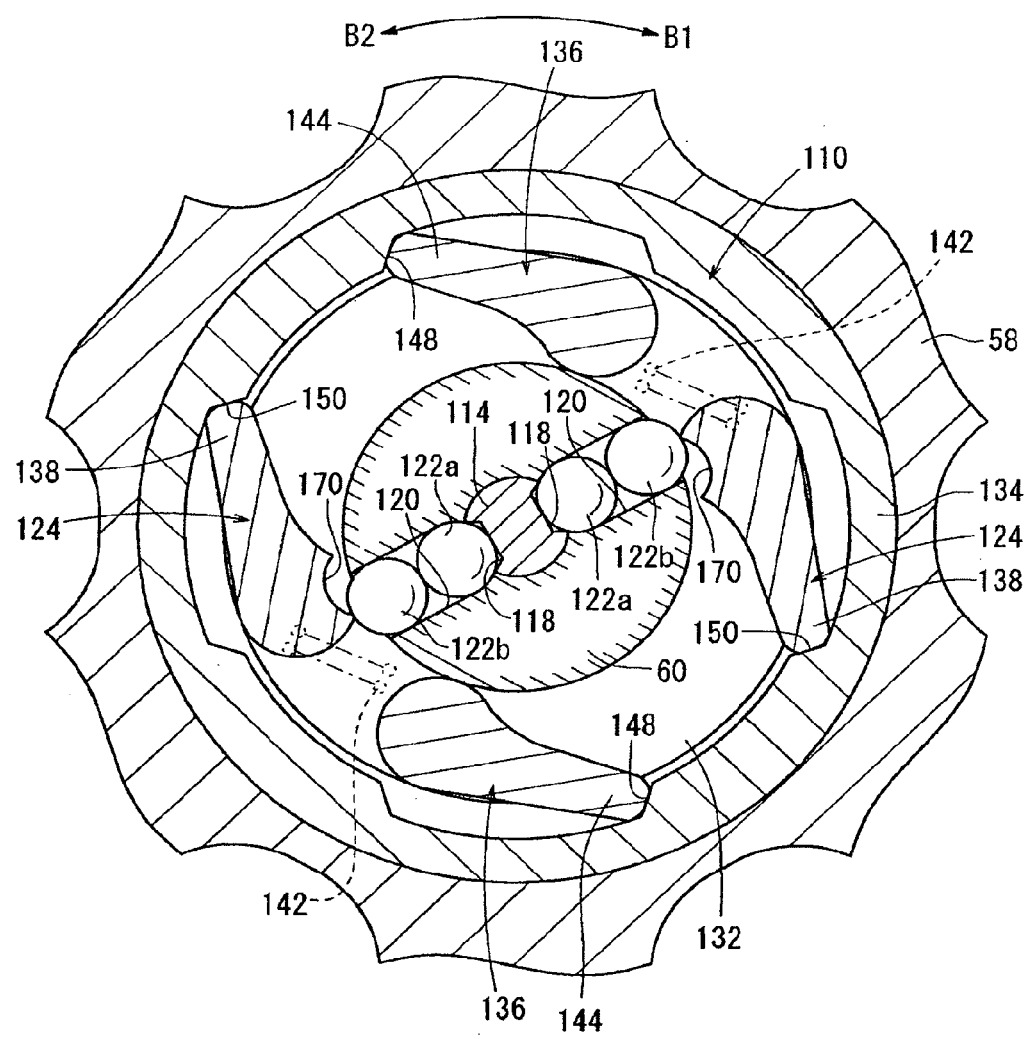
FIG. 5 is a cross-sectional view taken along line V-V of FIG. 4.

FIG. 4 is an enlarged view of a main part of the partial cross-sectional view taken along line III-III shown in FIG. 3. FIG. 5 is a cross-sectional view taken along line V-V of FIG. 4. The output shaft 60 has a hollow inside which the selector means 112 is disposed. The selector means 112 disposed inside the output shaft 60 contributes to a reduced size. The selector means 112 includes a first pressure section 114 and a second pressure section 116. The first pressure section 114 has an outside first end that is hollow and the second pressure section 116 is disposed inside the first pressure section 114.

The first pressure section 114 has two tapered first recesses 118, 118 formed at a leading end thereof. The output shaft 60 has first holes 120, 120 formed at respective areas facing the first recesses 118, 118. Two operative balls 122, 122 are disposed in each of the first holes 120, 120. Inner operative balls (operative balls on the side of the first pressure section 114) 122a, 122a abut on the first recesses 118, 118 in the first pressure section 114. Outer operative balls 122b, 122b abut on lock-up ratchets (reverse power transmitting means) 124, 124 of the clutch unit 110. A push rod 160 disposed at an end portion of the first pressure section 114 is urged in an outward direction (direction opposite to a direction of an arrow A) by a spring 162. The operative balls 122a, 122b are collectively called the operative balls 122.

The second pressure section 116 of the selector means 112 has two tapered second recesses 126, 126 formed at a leading end thereof. The first pressure section 114 has second holes 128, 128 formed at respective areas facing the second recesses 126, 126. Fixing balls 130, 130 are disposed in each of spaces formed by the second recesses 126 and the second holes 128. The second pressure section 116 is urged in the outward direction (direction opposite to the direction of the arrow A) by a spring 164.

The clutch unit 110 includes an inner race 132 and an outer race 134. The inner race 132 is disposed on an outer periphery of the output shaft 60 in a flange-like shape. The outer race 134 is disposed on an inner periphery of the drive gear 58. The inner race 132 includes a pair of one-way ratchets 136, 136 and a pair of lock-up ratchets 124, 124. The pair of lock-up ratchets 124, 124 and the pair of one-way ratchets 136, 136 have end portions 138, 138 and end portions 144, 144, respectively, urged outwardly by springs 142.

The outer race 134 includes a first locking portion 148. The first locking portion 148 has the following function. When the inner race 132 rotates in a direction of an arrow B2 relative to the outer race 134, the first locking portion 148 locks the end portion 144 of the one-way ratchet 136; when the inner race 132 rotates in a direction of an arrow B1 relative to the outer race 134, the first locking portion 148 does not lock the end portion 144 of the one-way ratchet 136. When the pedals 38L, 38R are pedaled in the direction in which the power-assisted bicycle 10 moves in the forward direction, the drive gear 58 rotates in the direction of the arrow B1. In such cases, the first locking portion 148 locks the end portion 144 of the one-way ratchet 136, so that the inner race 132 and the output shaft 60 rotate integrally with the drive gear 58. On, for example, a downhill road, the rear wheel WR rotates even when the pedals 38L, 38R are not pedaled and the rotation of the rear wheel WR causes the output shaft 60 to rotate in the direction of the arrow B1. In such cases, the inner race 132 rotates in the direction of the arrow B1 relative to the outer race 134, so that the first locking portion 148 is unable to lock the end portion 144 of the one-way ratchet 136. Accordingly, without considering the lock-up ratchet 124, the drive gear 58 does not rotate even when the output shaft 60 rotates.

The outer race 134 further includes a second locking portion 150. The second locking portion 150 has the following function. When the inner race 132 rotates in the direction of the arrow B1 relative to the outer race 134, the second locking portion 150 locks the end portion 138 of the lock-up ratchet 124; when the inner race 132 rotates in the direction of the arrow B2 relative to the outer race 134, the second locking portion 150 does not lock the end portion 138 of the lock-up ratchet 124. On, for example, a downhill road, the rear wheel WR rotates even when the pedals 38L, 38R are not pedaled and the rotation of the rear wheel WR causes the output shaft 60 to rotate in the direction of the arrow B1. In such cases, the inner race 132 rotates in the direction of the arrow B1 relative to the outer race 134, so that second locking portion 150 locks the end portion 138 of the lock-up ratchet 124, so that the outer race 134 and the drive gear 58 rotate integrally with the output shaft 60. When the pedals 38L, 38R are pedaled in the direction in which the power-assisted bicycle 10 moves in the forward direction, the drive gear 58 rotates in the direction of the arrow B1. In such cases, the second locking portion 150 is unable to lock the end portion 138 of the lock-up ratchet 124. Accordingly, without considering the one-way ratchet 136, the output shaft 60 does not rotate even when the drive gear 58 rotates.

Through the one-way ratchet 136 and the lock-up ratchet 124, the rotational force of the brushless motor 46 is transmitted to the output shaft 60. In addition, the rotational force of the rear wheel WR generated even when the rider does not pedal the pedals 38L, 38R, as on, for example, a slope is transmitted to the output shaft 60 via the fourth sprocket 70, the second chain 68, and the third sprocket 64 and the rotational force transmitted to the output shaft 60 is transmitted to the brushless motor 46. This allows the brushless motor 46 to regenerate electric energy from the rotational force of the rear wheel WR generated on, for example, a slope, so that the battery 32 can be recharged with the regenerated energy.

In the structure as described heretofore, when the rider pushes the push rod 160 of the first pressure section 114 in the direction of the arrow A, the first pressure section 114 moves in the direction of the arrow A to press the fixing balls 130 in the direction of the arrow A. The fixing balls 130 pressed in the direction of the arrow A press the second pressure section 116 in the direction of the arrow A. This results in the first pressure section 114 and the second pressure section 116 integrally moving in the direction of the arrow A.

When the first pressure section 114 and the second pressure section 116 move integrally, the fixing balls 130, 130 move in the direction of the arrow A, while receiving forces to be spaced apart from each other by inclined surfaces in the second recesses 126, 126. When the fixing balls 130, 130 move to retracting recesses 166, 166 in the output shaft 60, the fixing balls 130, 130 are retracted into the retracting recesses 166, 166. The retracting recess 166 is shaped such that the fixing ball 130 can fit therein. When the rider thereafter releases pressure on the push rod 160 of the first pressure section 114, the second pressure section 116 is moved in a direction opposite to the direction of the arrow A by the spring 164 (to return to its original position). However, the inclined surfaces in the second recesses 126, 126 abut on the fixing balls 130, 130 retracted in the retracting recesses 166, 166, so that the fixing balls 130, 130 are fixed in the position retracted in the retracting recesses 166, 166. As a result, the second pressure section 116 is unable to move in the direction opposite to the direction of the arrow A. Then, the first pressure section 114 is unable to return to its original position because of the fixing balls 130, so that the first pressure section 114 is fixed in place with the facing operative balls 122 being pushed out in a direction of mutually spaced apart from each other.

Figure 6:
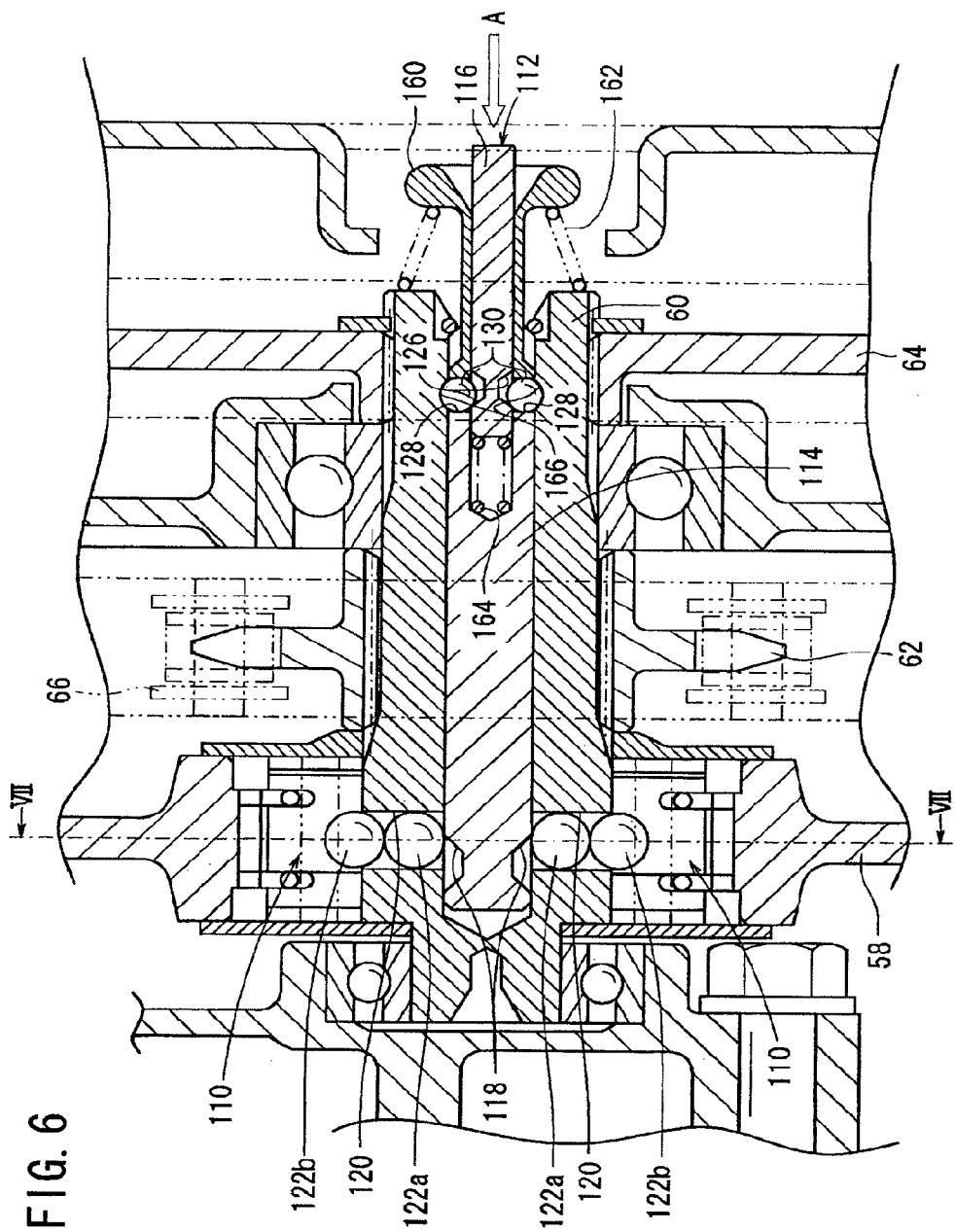
FIG. 6 is an enlarged view of the main part of the partial cross-sectional view taken along line III-III shown in FIG. 3 when a first pressure section 114 is fixed in place with facing operative balls being pushed out in a direction of mutually spaced apart from each other.
Figure 7:
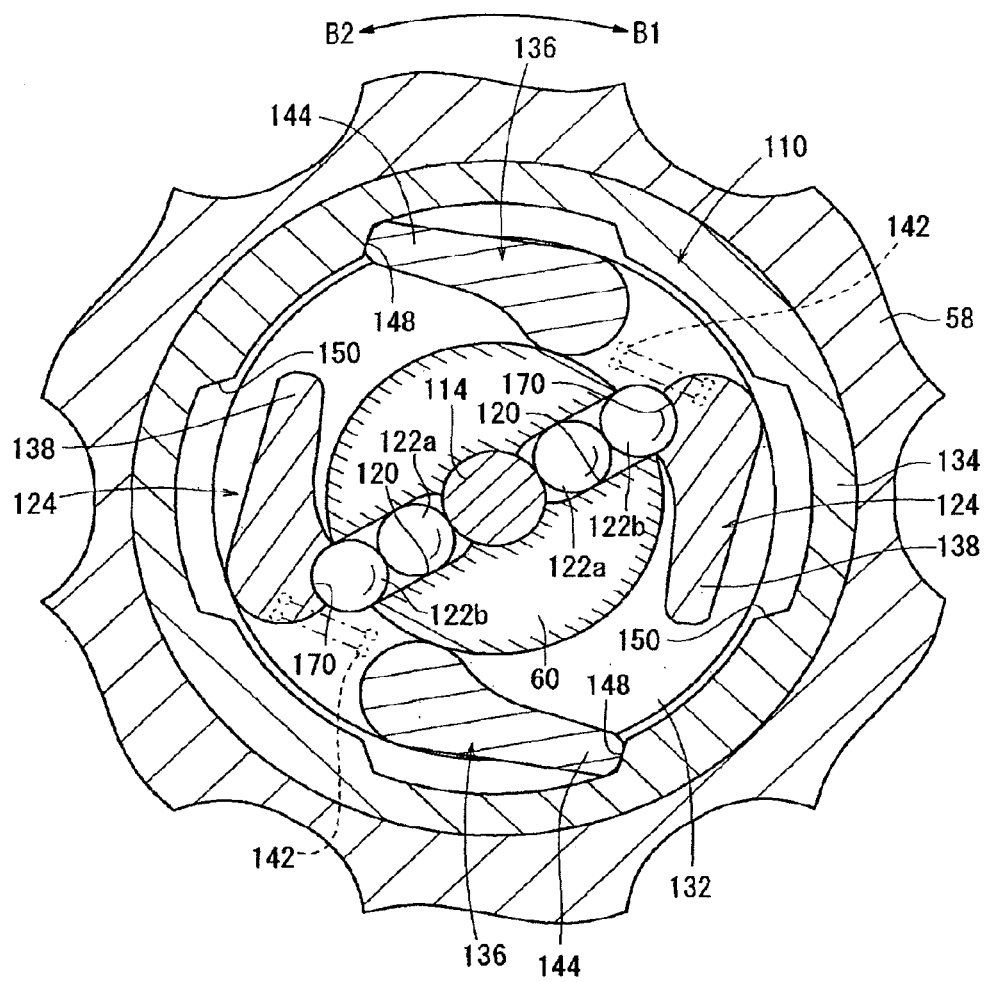
FIG. 7 is a cross-sectional view taken along line VII-VII of FIG. 6.

FIG. 6 is an enlarged view of the main part of the partial cross-sectional view taken along line III-III shown in FIG. 3 when the first pressure section 114 is fixed in place with facing operative balls 122 being pushed out in the direction of mutually spaced apart from each other. FIG. 7 is a cross-sectional view taken along line VII-VII of FIG. 6.

Referring to FIG. 7, the movement of the first pressure section 114 in the direction of the arrow A results in the operative balls 122 that face each other across the first pressure section 114 being pushed in directions of being mutually spaced apart from each other. The outer operative balls 122b, 122b thus press the lock-up ratchets 124, 124. When pressed by the outer operative balls 122b, 122b, the end portions 138, 138 of the lock-up ratchets 124, 124 move inwardly. The movement of the end portions 138, 138 causes the outer operative balls 122b, 122b to be fitted into recesses 170, 170 in the lock-up ratchets 124, 124.

In the condition shown in FIG. 7, even when the inner race 132 rotates in a direction of an arrow B1 relative to the outer race 134, the second locking portion 150 is unable to lock the end portion 138 of the lock-up ratchet 124. Consequently, when the first pressure section 114 is pressed in the direction of the arrow A, the clutch unit 110 permits the output of the driving force of the brushless motor 46 to the rear wheel WR, but not the output of power from the rear wheel WR to the brushless motor 46. The clutch unit 110 does not transmit power from the rear wheel WR to the brushless motor 46.

In the condition shown in FIG. 6, when the second recesses 126, 126 in the second pressure section 116 move to the areas facing the second holes 128, 128 as a result of the second pressure section 116 being pressed in the direction of the arrow A by the rider, the fixing balls 130 leave the retracting recesses 166, 166 to abut on the second recesses 126, 126. When the pressure on the second pressure section 116 is thereafter released, the springs 162, 164 cause the first pressure section 114 and the second pressure section 116 to move in the direction opposite to the direction of the arrow A, returning to initial positions (as shown in FIG. 4). When the first pressure section 114 and the second pressure section 116 return to their initial positions, the operative balls 122 facing each other across the first pressure section 114 move in directions of approaching each other, so that the inner operative balls 122a, 122a abut on the first recesses 118, 118.

The battery 32, while remaining sufficiently charged, does not require recharging. If, under this condition, the rotational force generated in the rear wheel WR is transmitted to the brushless motor 46, the brushless motor 46 functions as a load or brake (regenerative brake), causing the power-assisted bicycle 10 to be decelerated. This adds to unnecessary pedaling action on the part of the rider. The rider can therefore selectively recover regenerative energy with the brushless motor 46 as necessary by operating the selector means 112. Since whether to recover the regenerative energy or not can be determined by operating the selector means 112, there is no need to pedal unnecessarily. The regenerative energy can also be recovered without having to perform braking operations.

The clutch unit 110 is disposed on the side of the output shaft 60 opposite to the side of the drive shaft 56 of the brushless motor 46. This minimizes mechanical loss that would otherwise be generated when the pedals 38L, 38R are stopped, reducing motor load during coasting.

The brushless motor 46, being disposed between the crankshaft 36 and the power transmitting means 54, helps further reduce the motor load during coasting. The brushless motor 46, the power transmitting means 54, and other parts are housed in the same housing 42, which prevents oil and grease from being splashed from the lock-up ratchets 124 and other drive system parts (including the first sprocket 44 and the drive gear 58).

The clutch unit 110 is disposed between the drive gear 58 and the output shaft 60. The clutch unit 110 may nonetheless be disposed between the drive shaft 56 of the brushless motor 46 and the drive gear 58. This arrangement allows a clutch capacity to be reduced for reduction in weight. Accordingly, regeneration efficiency can be improved.

Figure 8:
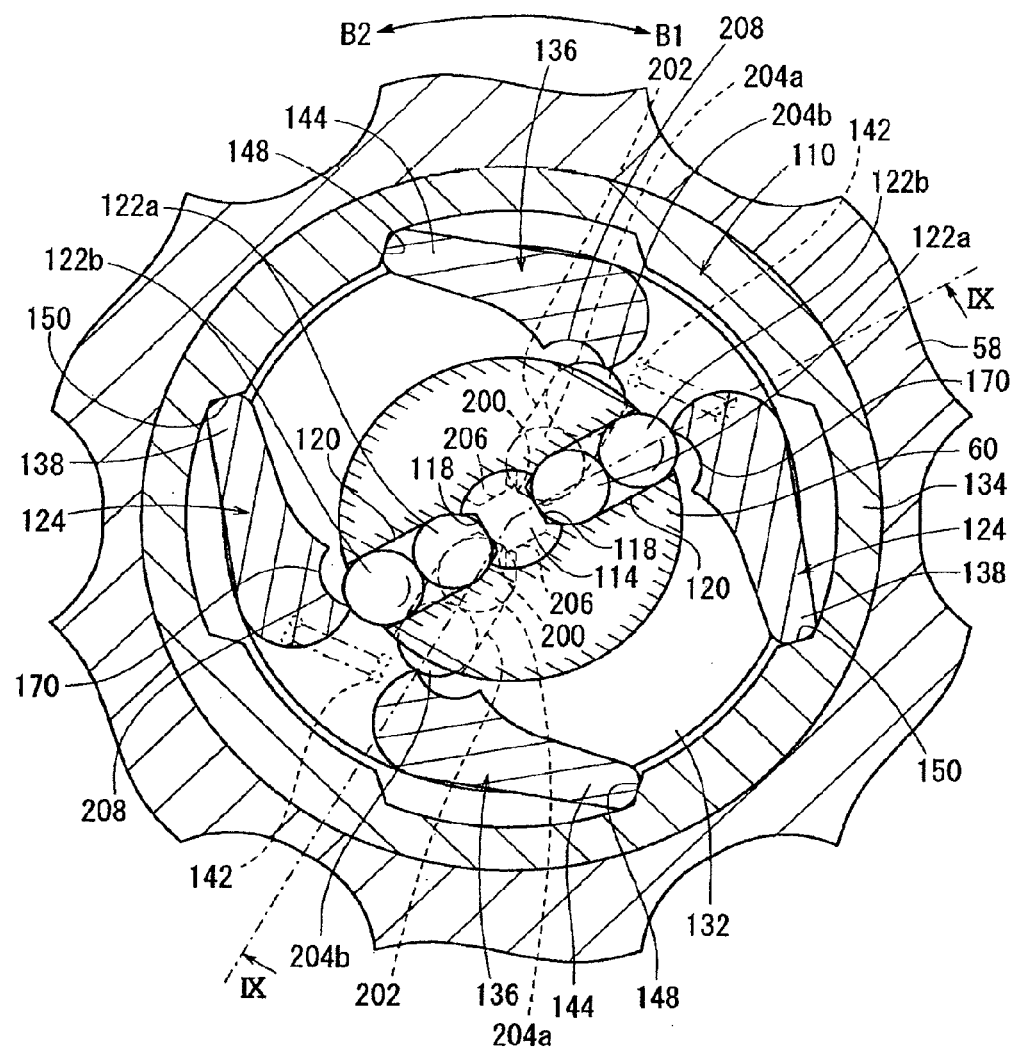
FIG. 8 is a schematic view showing an arrangement of a clutch unit in a modified example.
Figure 9:
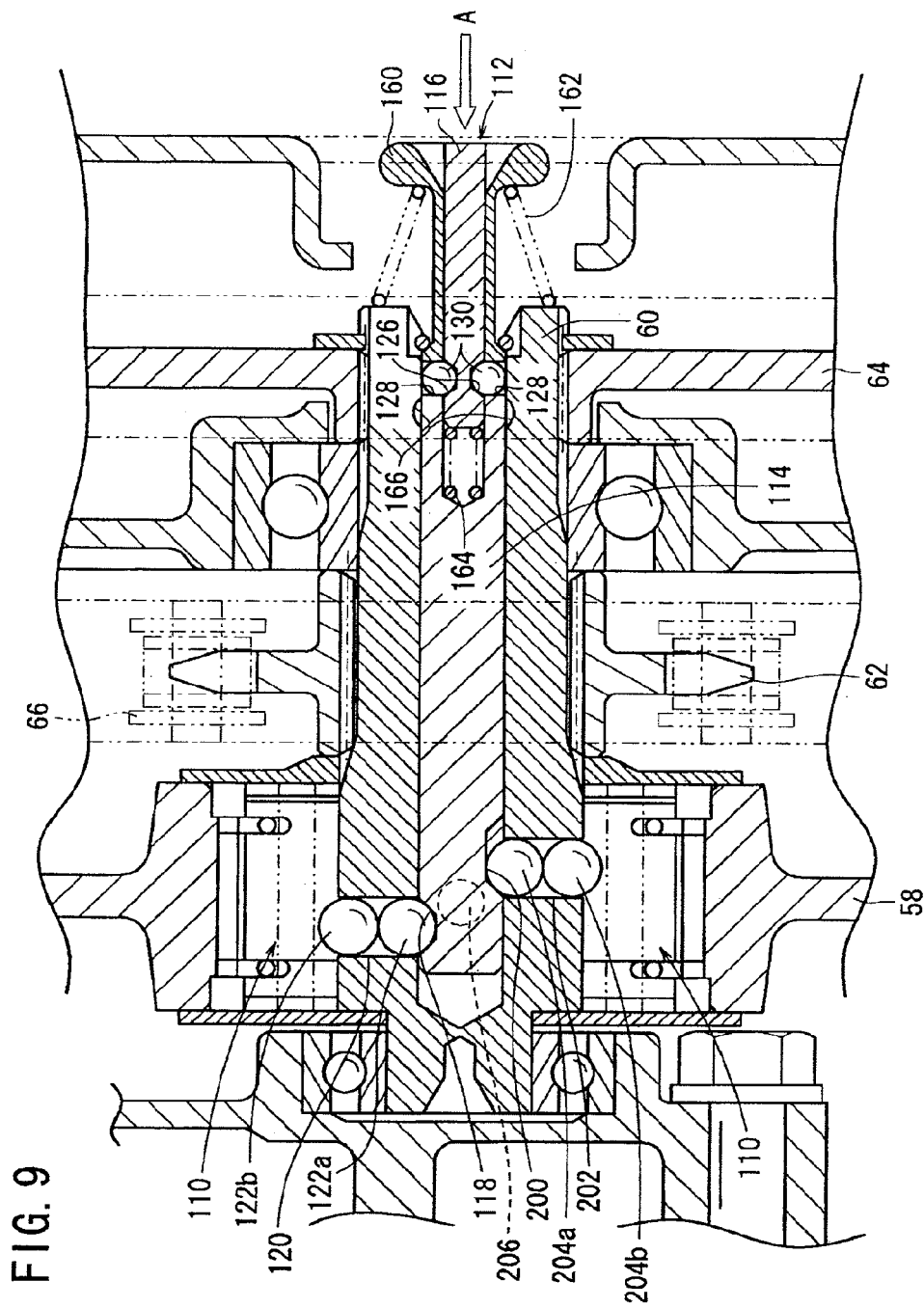
FIG. 9 is a cross-sectional view taken along line IX-IX of FIG. 8.

The embodiment of the present invention described heretofore may be modified as follows. FIG. 8 is a schematic view showing an arrangement of a clutch unit 110 according to a modified example. FIG. 9 is a cross-sectional view taken along line IX-IX of FIG. 8. Like or corresponding parts are identified by the same reference numerals as those used for the above embodiment of the present invention and only differences from the above embodiment will be described. A first pressure section 114 has two tapered first recesses 118, 118 formed at a leading end thereof. The first pressure section 114 further has two third recesses 200, 200 formed on the side closer to a push rod 160 (outside) than the two first recesses 118, 118. An output shaft 60 has third holes 202, 202 formed at respective areas facing the third recesses 200, 200. Two operative balls 204, 204 are disposed in each of the third holes 202, 202. Inner operative balls (operative balls on the side of the first pressure section 114) 204a, 204a abut on the third recesses 200, 200 in the first pressure section 114. Outer operative balls 204b, 204b abut on one-way ratchets 136, 136 of the clutch unit 110. The third recesses 200, 200 are shaped into a slot extending in an axial direction of the first pressure section 114. The operative balls 204a, 204b are collectively called the operative balls 204.

In the embodiment of the present invention described earlier, the one-way ratchets 136, 136 and the lock-up ratchets 124, 124 are disposed on the same plane (see FIGS. 4 to 7). In the modified example, however, the one-way ratchets 136, 136 and lock-up ratchets 124, 124 are not disposed on the same plane. The lock-up ratchets 124, 124 are disposed on the side closer to a leading end of the first pressure section 114 than the one-way ratchets 136, 136.

The first pressure section 114 further has fourth recesses 206, 206 having a substantially identical shape as the first recesses 118, 118. The fourth recesses 206, 206 are disposed midway between the first recesses 118, 118 and the third recesses 200, 200 along the axial direction of the first pressure section 114. In addition, the fourth recesses 206, 206 are disposed at positions rotated 90 degrees from the first recesses 118, 118 about the axis of the first pressure section 114.

The second locking portion 150 of the outer race 134 has the function, as described earlier, of locking the end portion 138 of the lock-up ratchet 124 when the inner race 132 rotates in the direction of an arrow B1 relative to the outer race 134, and not locking the end portion 138 of the lock-up ratchet 124 when the inner race 132 rotates in the direction of an arrow B2 relative to the outer race 134.

The first locking portion 148 of the outer race 134 has the function, as described earlier, of locking the end portion 144 of the one-way ratchet 136 when the inner race 132 rotates in the direction of the arrow B2 relative to the outer race 134, and not locking the end portion 144 of the one-way ratchet 136 when the inner race 132 rotates in the direction of the arrow B1 relative to the outer race 134.

When the pedals 38L, 38R are pedaled in the direction in which the power-assisted bicycle 10 moves in the forward direction under the condition shown in FIGS. 8 and 9, the drive gear 58 rotates in the direction of the arrow B1, so that the first locking portion 148 locks the end portion 144 of the one-way ratchet 136. Accordingly, the inner race 132 and the output shaft 60 rotate integrally with the drive gear 58. Rotation of the rear wheel WR as on a downhill road causes the output shaft 60 to rotate in the direction of the arrow B1. In such cases, the inner race 132 rotates in the direction of the arrow B1 relative to the outer race 134, so that the second locking portion 150 locks the end portion 138 of the lock-up ratchet 124. Accordingly, the outer race 134 and the drive gear 58 rotate integrally with the output shaft 60.

In the structure as described above, when the rider pushes the push rod 160 of the first pressure section 114 in the direction of the arrow A, the inclined surfaces of the first recesses 118, 118 push out the operative balls 122 facing each other across the first pressure section 114 in a direction of being spaced apart from each other. At the same time, the fixing balls 130 are retracted to the retracting recesses 166, 166. When the rider thereafter releases pressure on the first pressure section 114, the first pressure section 114 and the second pressure section 116 are fixed in place and the facing operative balls 122 are fixed in conditions pushed out in the direction of being spaced apart from each other. Note that the third recesses 200, 200 are shaped like a slot, so that the inner operative balls 204a, 204a abut on the third recesses 200, 200 even when the first pressure section 114 is fixed in the pressed condition. More specifically, the facing operative balls 204, 204 are not pushed out in the direction of being spaced apart from each other even when the first pressure section 114 is pressed.

Figure 10:
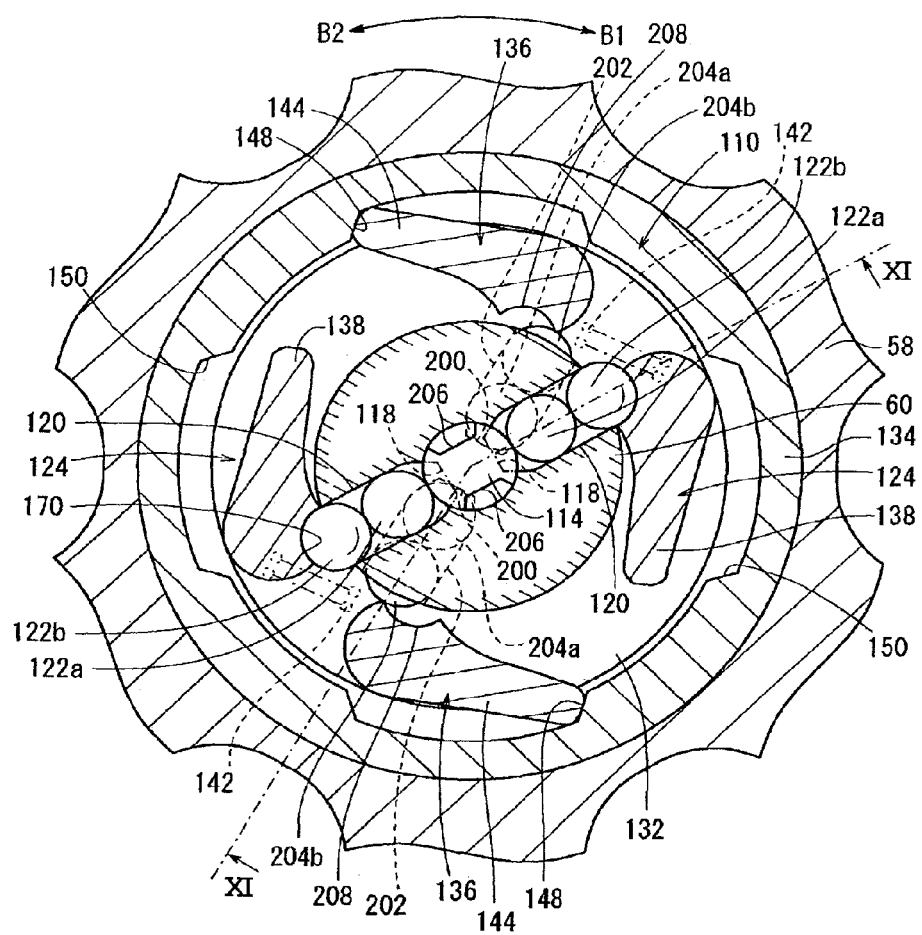
FIG. 10 is an illustration showing a condition of the clutch unit shown in FIG. 8 when the first pressure section 114 is fixed with facing operative balls pushed out in a direction of being spaced apart from each other.
Figure 11:
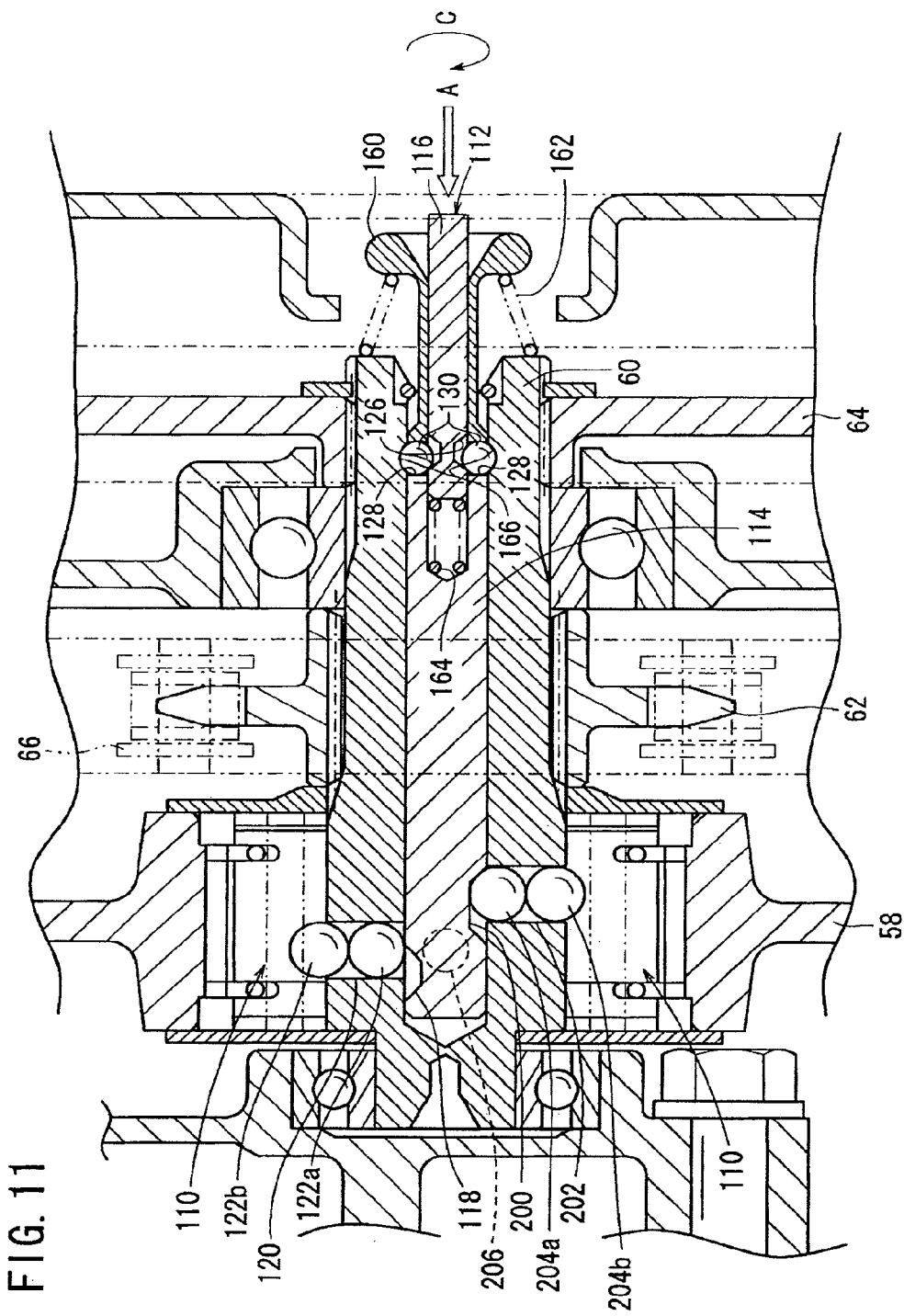
FIG. 11 is a cross-sectional view taken along line XI-XI of FIG. 10.

FIG. 10 is an illustration showing a condition of the clutch unit 110 shown in FIG. 8 when the first pressure section 114 is fixed with the facing operative balls 122 pushed out in the direction of being spaced apart from each other. FIG. 11 is a cross-sectional view taken along line XI-XI of FIG. 10.

Movement of the first pressure section 114 in the direction of the arrow A results in the operative balls 122 that face each other across the first pressure section 114 being pushed out in the direction of being spaced apart from each other, so that the outer operative balls 122b, 122b press the lock-up ratchets 124, 124. The end portions 138, 138 of the lock-up ratchets 124, 124 move inwardly when pressed by the outer operative balls 122b, 122b. As a result, the outer operative balls 122b, 122b fit into the recesses 170, 170 in the lock-up ratchets 124, 124.

In the condition shown in FIG. 10, the second locking portion 150 is unable to lock the end portion 138 of the lock-up ratchet 124 even when the inner race 132 rotates in the direction of the arrow B1 relative to the outer race 134. Consequently, when the first pressure section 114 is pressed in the direction of the arrow A, the clutch unit 110 permits the output of the driving force of the brushless motor 46 to the rear wheel WR, but not the output of power from the rear wheel WR to the brushless motor 46.

In the condition shown in FIG. 11, the rider rotates the push rod 160 to thereby rotate the first pressure section 114 90 degrees in the direction of an arrow C. Retracting recesses 166 are formed into grooves so as to allow the first pressure section 114 and the second pressure section 116 in a fixed condition to be rotatable. Since the third recesses 200, 200 are also rotated 90 degrees by the rotation of the first pressure section 114, the operative balls 204, 204 facing each other across the first pressure section 114 move in a direction of being spaced apart from each other. At this time, the fourth recesses 206, 206 are disposed through rotation of 90 degrees at areas facing the inner operative balls 122a, 122a, so that the facing operative balls 122, 122 move in directions of approaching each other and the inner operative balls 122a, 122a abut on the fourth recesses 206, 206.

Figure 12:
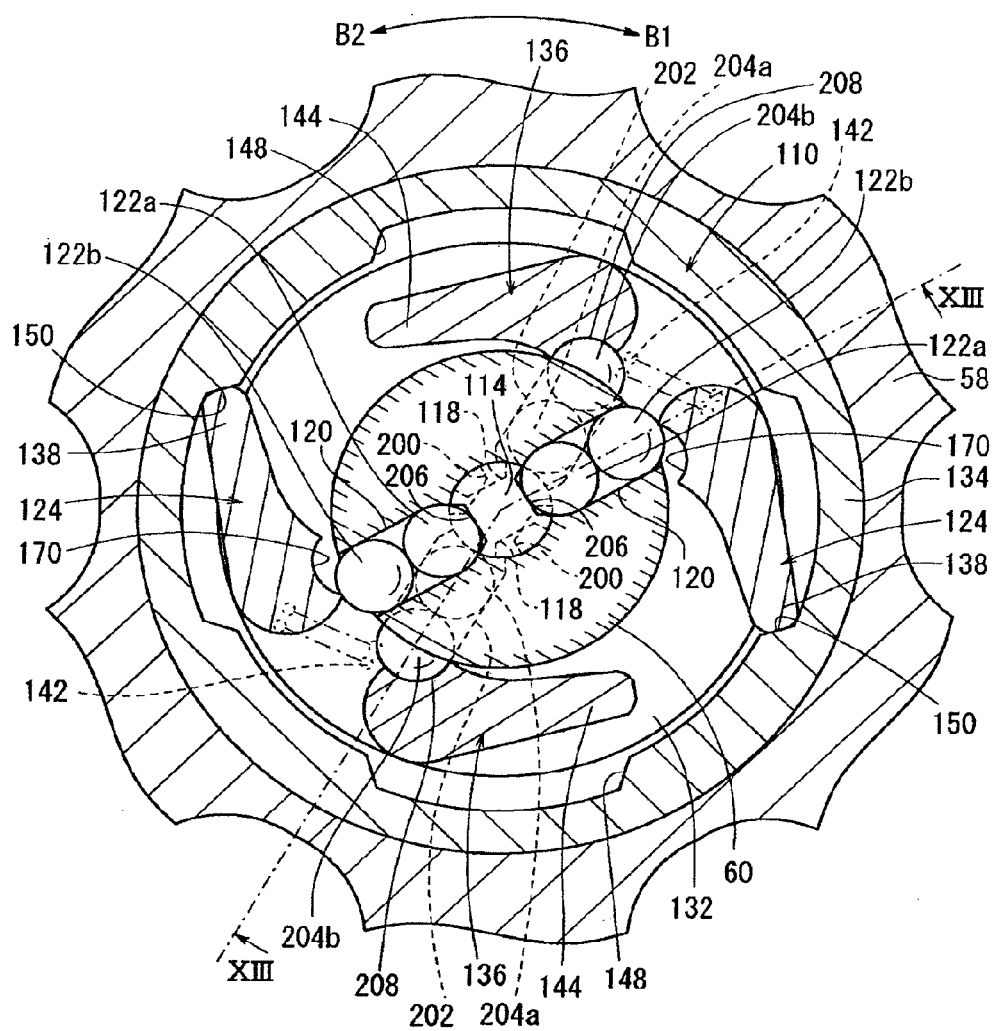
FIG. 12 is an illustration showing a condition of the clutch unit shown in FIG. 8 when the first pressure section is rotated in the condition shown in FIG. 11.
Figure 13:
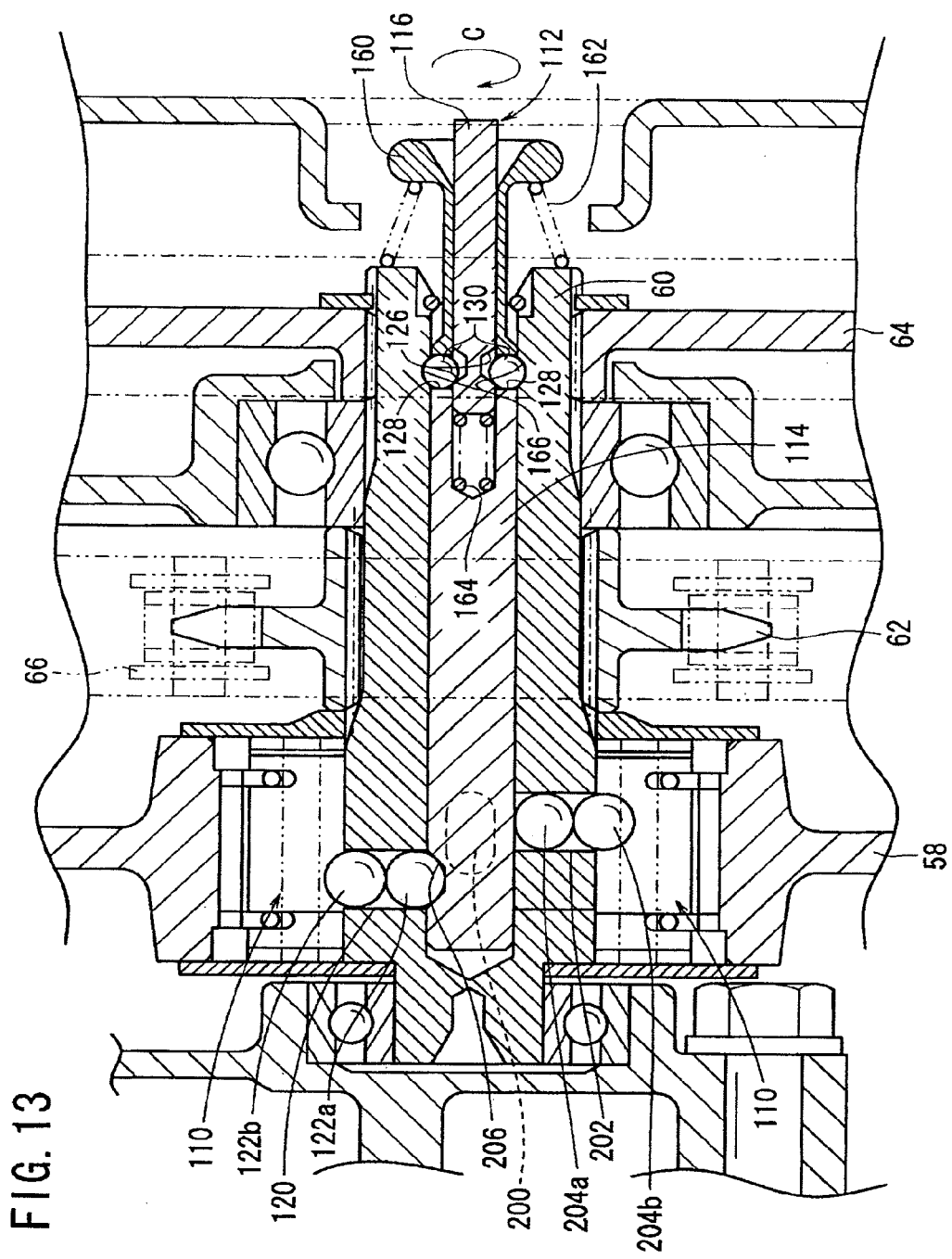
FIG. 13 is a cross-sectional view taken along line XIII-XIII of FIG. 12.

FIG. 12 is an illustration showing a condition of the clutch unit 110 shown in FIG. 8 when the first pressure section 114 is rotated in the condition shown in FIG. 11. FIG. 13 is a cross-sectional view taken along line XIII-XIII of FIG. 12.

In the condition shown in FIGS. 12 and 13, pressure by the outer operative balls 122b, 122b is released, which allows the lock-up ratchets 124, 124 to be moved outwardly by the springs 142. This allows the second locking portion 150 to lock the end portion 138 of the lock-up ratchet 124 when the inner race 132 rotates in the direction of the arrow B1 relative to the outer race 134.

In addition, the operative balls 204, 204 facing each other across the first pressure section 114 move in a direction of being spaced apart from each other, so that the outer operative balls 204b, 204b press the one-way ratchets 136, 136. The end portions 144, 144 of the one-way ratchets 136, 136 move inwardly when pressed by the outer operative balls 204b, 204b. The inward movement of the end portions 144, 144 causes the outer operative balls 204b, 204b to fit into recesses 208, 208 in the one-way ratchets 136, 136. As a result, the first locking portion 148 is unable to lock the end portion 144 of the one-way ratchet 136 when the inner race 132 rotates in the direction of the arrow B2 relative to the outer race 134. When the first pressure section 114 is pressed and then rotated 90 degrees, therefore, the clutch unit 110 permits the output of power from the rear wheel WR to the brushless motor 46, but not the output of the driving force of the brushless motor 46 to the rear wheel WR.

As described above, in the modified example, the lock-up ratchet 124 and the one-way ratchet 136 can be selectively made operative or inoperative by operating the selector means 112. Electric energy can therefore be regenerated as necessary and the driving force of the brushless motor 46 can be prohibited from being transmitted to the rear wheel WR.

Note that the initial condition (the condition shown in FIGS. 8 and 9) can be restored by first turning the push rod 160, in the condition shown in FIGS. 12 and 13, in a direction opposite to the direction of the arrow C (to restore the condition shown in FIGS. 10 and 11) and then pressing the second pressure section 116.

Preferred embodiments of the present invention have been presented for the purposes of illustration and description. They are not intended to be exhaustive or to limit the invention to the precise forms disclosed. It will be understood by those skilled in the art that various changes in form and detail may be made therein without departing from the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle with an auxiliary power unit including a detecting controller configured to detect a torque value of a pedaling torque applied to a crankshaft for controlling an output of a motor according to the torque value detected, the bicycle comprising:

a power transmission configured to output the pedaling torque applied to the crankshaft to a drive wheel and including a clutch unit, wherein the clutch unit includes a one-way ratchet permitting an output of a driving force of the motor to the drive wheel, but not an output of power from the drive wheel to the motor; and a selection device configured to select whether or not to permit transmission of power from the drive wheel to the motor;

wherein the clutch unit further includes a lock-up ratchet cooperating with the selection device to selectively permit an output of power from the drive wheel to the motor according to an operation of the selection device.

2. The bicycle with an auxiliary power unit according to claim 1, wherein the clutch unit normally permits transmission of only the power from the crankshaft to the drive wheel and, when the lock-up ratchet is made operative through the operation of the selection device, permits transmission of power from the drive wheel to the motor.

3. The bicycle with an auxiliary power unit according to claim 2, wherein the power transmission includes:

a hollow output shaft for outputting power to the drive wheel;

wherein the selection device is disposed inside the output shaft; and wherein the lock-up ratchet is selectively made operative or inoperative by pressing the selection device.

4. The bicycle with an auxiliary power unit according to claim 3, wherein the clutch unit is interposed between the output shaft and a drive shaft of the motor.

5. The bicycle with an auxiliary power unit according to claim 4, wherein the power transmission includes:

a motor driving force transmission configured to transmit the driving force of the motor to the output shaft;

wherein the clutch unit is disposed on a side of the output shaft; and wherein the motor driving force transmission transmits the driving force of the motor to the output shaft via the clutch unit.

6. The bicycle with an auxiliary power unit according to claim 5, wherein the motor is disposed between the crankshaft and the power transmission.

7. The bicycle with an auxiliary power unit according to claim 3, wherein the pedaling torque applied to the crankshaft and the driving force of the motor are transmitted to the output shaft.

8. The bicycle with an auxiliary power unit according to claim 4, wherein the power transmission includes:

a motor driving force transmission configured to transmit the driving force of the motor to the output shaft;

wherein the clutch unit is disposed on a side of the drive shaft of the motor; and wherein the driving force of the motor is transmitted to the motor driving force transmission via the clutch unit.

9. The bicycle with an auxiliary power unit according to claim 3, wherein the selection device includes:

a first pressure section having a hollow outside end and a second pressure section disposed inside the first pressure section; and wherein pressing the first pressure section makes the lock-up ratchet inoperative and pressing the second pressure section makes the lock-up ratchet operative.

10. The bicycle with an auxiliary power unit according to claim 9, wherein the pedaling torque applied to the crankshaft and the driving force of the motor are transmitted to the output shaft.

11. The bicycle with an auxiliary power unit according to claim 1, wherein the power transmission is accommodated together with the motor in a case.

12. A bicycle with an auxiliary power unit including a controller configured to detect a torque value of a pedaling torque applied to a crankshaft for controlling an output of a motor according to the torque value detected, the bicycle comprising:
 a power transmission configured to output the pedaling torque applied to the crankshaft to a drive wheel and including a clutch unit for permitting an output of a driving force of the motor to the drive wheel, but not an output of power from the drive wheel to the motor; and
 a selection device configured to select whether or not to permit transmission of power from the drive wheel to the motor;
 wherein the clutch unit includes a lock-up ratchet configured to selectively permit an output of power from the drive wheel to the motor according to an operation of the selection device, and the clutch unit further includes a one-way ratchet,
 wherein the selection device includes a first pressure section having a hollow outside end and a second pressure section disposed inside the first pressure section, wherein pressing the first pressure section makes the lock-up ratchet inoperative and pressing the second pressure section makes the lock-up ratchet operative,
 wherein the selection device further includes:
 a function of selecting whether or not to permit transmission of the driving force from the motor to the drive wheel; and
 a function of rotating the first pressure section when the lock-up ratchet is inoperative makes the one-way ratchet inoperative and the lock-up ratchet operative, to thereby allow the clutch unit not to permit transmission of the driving force from the motor to the drive wheel and to permit transmission of power from the drive wheel to the motor.

13. The bicycle with an auxiliary power unit according to claim 12, wherein the pedaling torque applied to the crankshaft and the driving force of the motor are transmitted to the output shaft.

14. An auxiliary power unit for a vehicle, comprising:
 a controller configured to detect a torque value of a torque applied to a crankshaft of the vehicle for controlling an output of a motor according to the torque value detected;
 a power transmission configured to output the torque applied to the crankshaft;
 a clutch unit including a one-way ratchet permitting an output of a driving force of the motor, but not an output of power from a drive wheel to the motor; and
 a selection device configured to select whether or not to permit transmission of power from the drive wheel to the motor;
 wherein the clutch unit further includes a lock-up ratchet cooperating with the selection device to selectively permit an output of power from the drive wheel to the motor according to an operation of the selection device.

15. The auxiliary power unit according to claim 14, wherein
 the clutch unit normally permits transmission of only the power from the crankshaft to the drive wheel and, when the lock-up ratchet is made operative through the operation of the selection device, permits transmission of power from the drive wheel to the motor.

16. The auxiliary power unit according to claim 15, wherein the power transmission includes:
 a hollow output shaft for outputting power to the drive wheel;
 wherein the selection device is disposed inside the output shaft; and
 wherein the lock-up ratchet is selectively made operative or inoperative by pressing the selection device.

17. The auxiliary power unit according to claim 16, wherein the selection device includes:
 a first pressure section having a hollow outside end and a second pressure section disposed inside the first pressure section; and
 wherein pressing the first pressure section makes the lock-up ratchet inoperative and pressing the second pressure section makes the lock-up ratchet operative.

18. The auxiliary power unit according to claim 17, wherein the selection device further includes:
 a function of selecting whether or not to permit transmission of the driving force from the motor to the drive wheel; and
 a function of rotating the first pressure section when the lock-up ratchet is inoperative makes the one-way ratchet inoperative and the lock-up ratchet operative, to thereby allow the clutch unit not to permit transmission of the driving force from the motor to the drive wheel and to permit transmission of power from the drive wheel to the motor.

19. The auxiliary power unit according to claim 16, wherein the torque applied to the crankshaft and the driving force of the motor are transmitted to the output shaft.

20. The auxiliary power unit according to claim 16, wherein the clutch unit is interposed between the output shaft and a drive shaft of the motor.

* * * * *